G. M. RHONEMUS.
LID REMOVER.
APPLICATION FILED FEB. 18, 1916.
1,211,233. Patented Jan. 2, 1917.
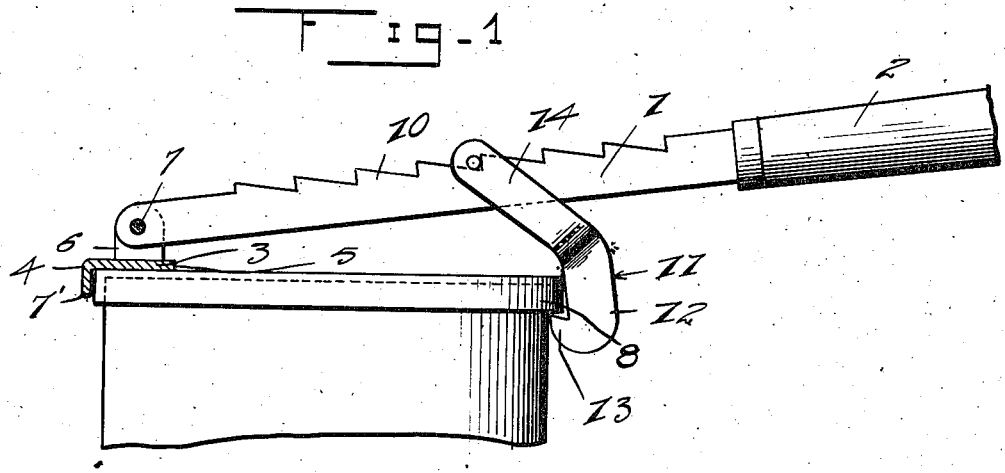
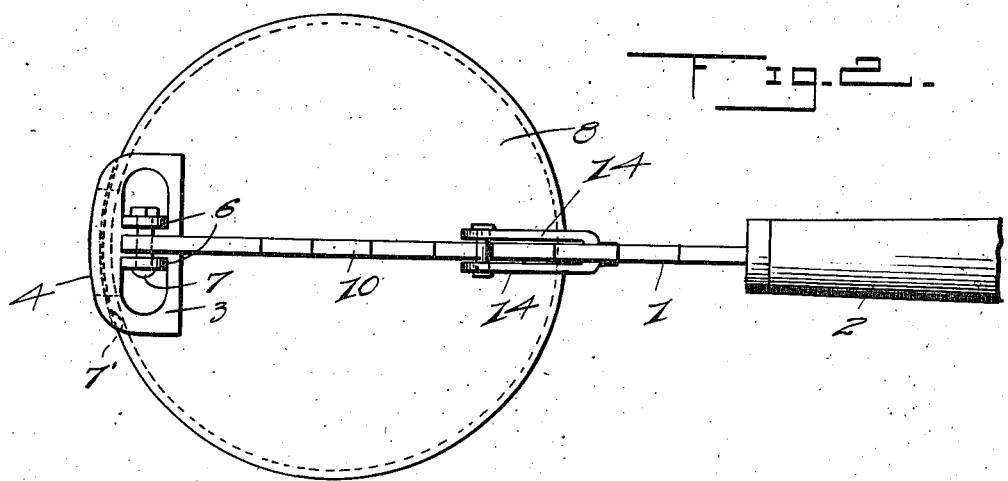
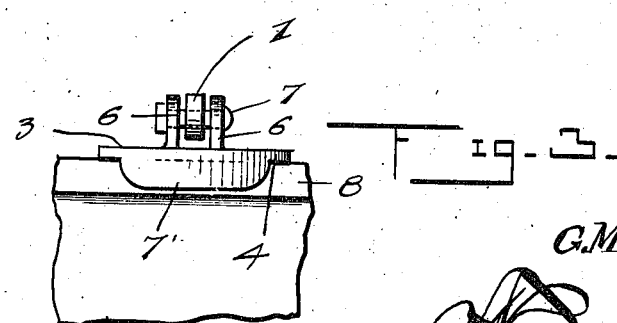
Witnesses
Inventor
G. M. Rhonemus.
By
Attorney

UNITED STATES PATENT OFFICE.

GEORGE M. RHONEMUS, OF INDEPENDENCE, MISSOURI.

LID-REMOVER.

1,211,233.   Specification of Letters Patent.   Patented Jan. 2, 1917.

Application filed February 18, 1916. Serial No. 79,126.

*To all whom it may concern:*

Be it known that I, GEORGE M. RHONEMUS, a citizen of the United States, residing at Independence, in the county of Jackson and State of Missouri, have invented certain new and useful Improvements in Lid-Removers; and I do hereby declare the following to be a full, clear, and exact description of the invention, such as will enable others skilled in the art to which it appertains to make and use the same.

This invention relates to new and useful improvements in lid removers and one of its objects is the provision of a device of this character, which shall be simple, durable and efficient, and which may be manufactured and sold at a comparatively low cost.

Another object of this invention is to provide a shank, having means pivotally secured to one end to engage the under edge of a flange of a lid and an adjustable dog to engage the flange at a point directly opposite to accommodate or be applicable to lids of various sizes and which will easily and quickly remove them from a receptacle to which they are applied.

A further object of this invention is to provide a plate pivoted to one end of the shank adapted to rest upon one edge of the lid and have a downwardly extending extension to engage the flange of the lid to firmly hold and support one end of the shank, so that when the opposite end which carries the adjustable dog is pulled upwardly the lid opposite to which the plate rests upon will be moved upwardly away from the receptacle.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawing, in which:—

Figure 1 is a side elevation of a lid remover, constructed in accordance with my invention, Fig. 2 is a top plan view of the device, and Fig. 3 is an end view of the plate and an extension resting upon the lid and engaging the flange of same.

Referring in detail to the drawing, the numeral 1 indicates a shank, having a suitable handle 2, secured to one end thereof by any suitable means. A segmental plate 3 is provided with a curved edge 4 and a straight edge 5 and has a pair of ears 6 stamped upwardly therefrom to receive one end of the shank 1. The ears 6 are pivotally secured to the shank 1 by a pin 7, whereby the plate 3 may rest flatly upon a lid 8 at all times. An arcuate extension 7' is formed on the curved edge 4 of the plate 3 and depends downwardly therefrom, to engage the side of a flange of the cover 8 and firmly holds the plate upon the lid.

The shank 1 is provided with a plurality of forwardly projecting teeth 10 on the top edge to adjustably support a dog 11. The dog 11 consists of a body portion 12, having an upwardly extending hook 13, formed on the lower end and its upper end bifurcated to form arms 14, which extend upwardly and forwardly to receive the shank 1. A pin 15 passes through the upper ends of the arms 14 and is received by the teeth 10 to support the dog 11 at any desired point along the shank 1.

In operation the plate 3 is placed upon the cover 8, adjacent one edge and the arcuate extension 7' engages the flange of the lid 8. The dog 11 is then adjusted along the shank 1 until a proper width is obtained and the hook 13 of the dog 11 engages the edge of the flange at a point directly opposite the plate 3 and by pulling or lifting upwardly upon the handle 2 the dog 11 will raise the portion of the lid 8 which it engages and the plate 3 will act as a fulcrum to the end of the shank 1 to which it is attached.

From the foregoing description taken in connection with the accompanying drawing, it will be readily seen that a lid remover of the above described character, may be readily and easily applied to lids of various sizes to easily and quickly remove them from a receptacle.

While I have shown and described the preferred embodiment of my invention, it will be understood that minor changes in construction, combination and arrangement of parts may be made without departing from the spirit and scope of the invention as claimed.

Having thus described my invention, what I claim is:—

A lid remover comprising a plate having struck up portions to form a pair of relatively spaced ears, one edge of said plate being of arcuate shape, an arcuate extension formed on the arcuate curved edge of said plate to engage the flange of a cover, a shank pivoted to said ears and overlying the cover, a handle secured to the shank, teeth formed on the upper longitudinal edge of the shank, a dog engaging the cover and having one end bifurcated to receive the shank, and a pin extending through the bifurcated end to engage the teeth for holding the dog at various adjusted positions on the shank.

In testimony whereof I affix my signature in presence of two witnesses.

GEORGE M. RHONEMUS.

Witnesses:
W. G. SMITH,
H. B. STERRETT.